United States Patent
Chin et al.

(10) Patent No.: US 7,213,404 B2
(45) Date of Patent: May 8, 2007

(54) METHOD FOR CONTROLLING OPERATION OF AIR CONDITIONING SYSTEM

(75) Inventors: Sim-Won Chin, Gyeonggi-do (KR); Chan-Ho Song, Gyeonggi-do (KR); Deok Huh, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 192 days.

(21) Appl. No.: 10/796,147

(22) Filed: Mar. 10, 2004

(65) Prior Publication Data
US 2005/0022544 A1 Feb. 3, 2005

(51) Int. Cl.
F25B 41/04 (2006.01)
F25B 1/00 (2006.01)

(52) U.S. Cl. .......... 62/222; 62/228.1; 62/228.5; 62/226

(58) Field of Classification Search ............ 62/222, 62/226, 223, 228.1, 228.5
See application file for complete search history.

(56) References Cited

FOREIGN PATENT DOCUMENTS

| JP | 07027426 A | * | 1/1995 |
| KR | 1996-0034906 B1 | | 10/1996 |

* cited by examiner

Primary Examiner—Chen Wen Jiang
(74) Attorney, Agent, or Firm—Birch, Stewart, Kolasch & Birch, LLP

(57) ABSTRACT

A method for controlling the operation of an air conditioning system, including the steps of operating the air conditioning system until a frequency of a compressor reaches to a preset target frequency, stabilizing the operation of the system after the frequency of the compressor reaches to the preset target frequency, and operating the system at a fixed level. The system stabilizing step includes a first step for regulating opening of the expansion device, to increase the degree of superheat of refrigerant at an outlet of the compressor, comparing a temperature change rate of the condenser with respect to time to a preset temperature change rate, and a second step for, if the temperature change rate of the condenser with respect to time is lower than the preset temperature changer rate, comparing the degree of superheat of refrigerant at an outlet of the compressor to a preset degree of superheat of refrigerant at an outlet of the compressor, and opening the opening of the expansion device to a preset state, if the degree of superheat of refrigerant at an outlet of the compressor is higher than the preset degree of superheat of refrigerant at an outlet of the compressor.

19 Claims, 4 Drawing Sheets

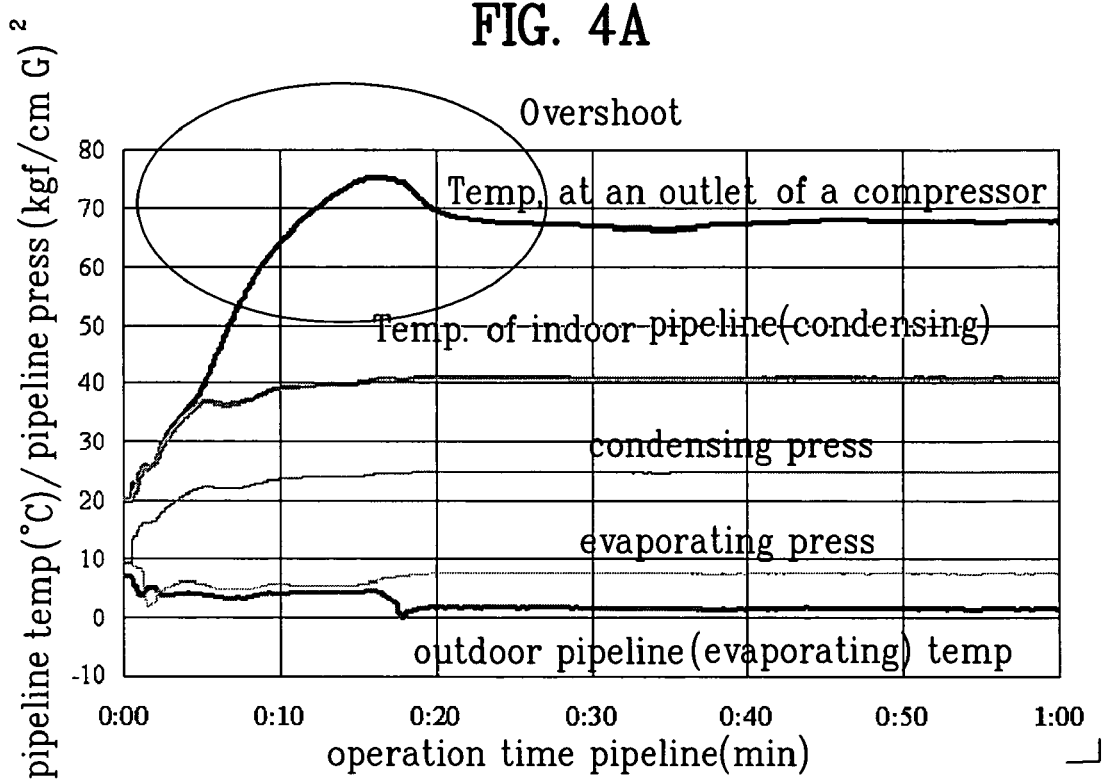
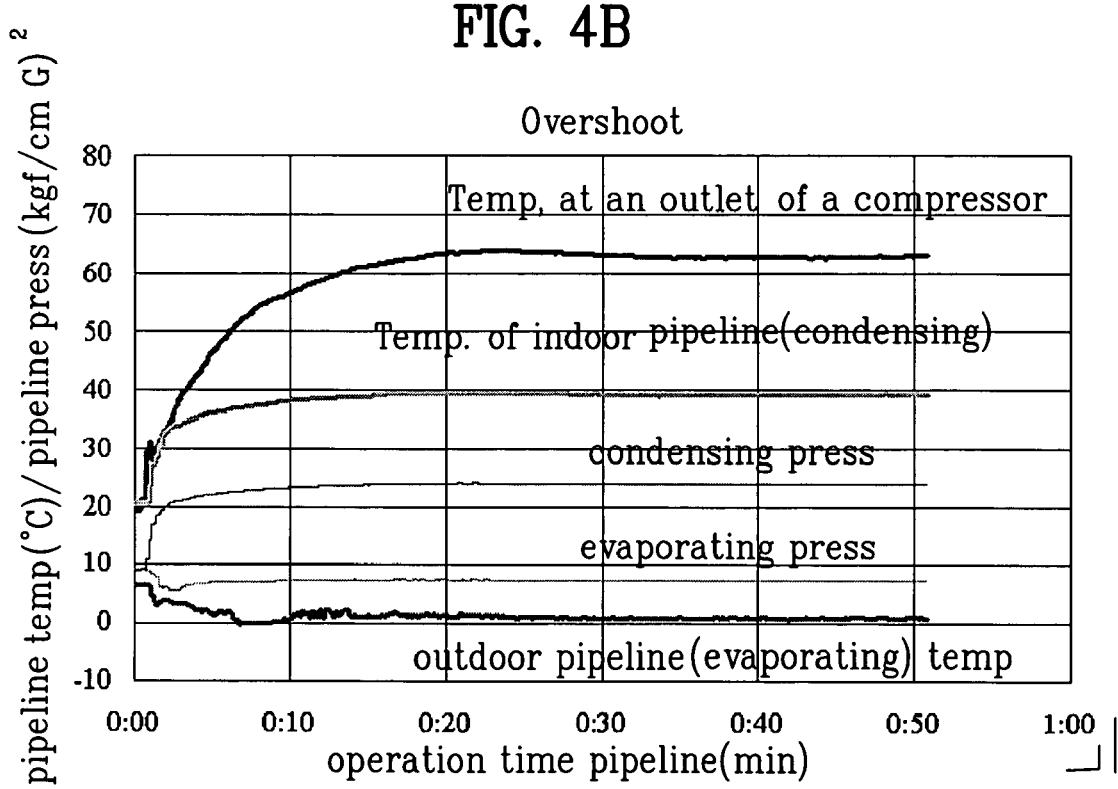

METHOD FOR CONTROLLING OPERATION OF AIR CONDITIONING SYSTEM

This application claims the benefit of the Korean Application No. P2003-0053464 filed on Aug. 1, 2003, which is hereby incorporated by reference.

BACKGROUND OF THE INVENTION

1. Field of the Invention

The present invention relates to methods for controlling the operation of an air conditioning system, and, more particularly, to a method for controlling the operation of an air conditioning system, in which the air conditioning system can be quickly stabilized, after starting, into a regular operation.

2. Background of the Related Art

In general, the air conditioner adjusts temperature, humidity, air flow, cleanliness of air, and etc., in a particular area suitable to purposes of use, such as cooling or heating room spaces, like residing spaces, restaurants, library, or offices, with a compressor and heat exchangers, and circulating refrigerant therethrough.

A related art inverter air conditioner and a method for controlling the operation of the same will be described, and problems related thereto will be discussed.

The related art inverter air conditioner is provided with a compressor, an outdoor heat exchanger serving as a condenser, an indoor heat exchanger serving as an evaporator, an expansion device between the outdoor heat exchanger and the indoor heat exchanger, pipelines connected between the parts, and a microprocessor (not shown) for progressing a refrigerating cycle of the inverter air conditioner with reference to a preset room cooling temperature, an outdoor temperature, and a room temperature.

The expansion device may be a capillary tube, an electronic Thermal Expansion Valve (TXV), or a Linear Expansion Valve (LEV). In the case of the inverter air conditioner, since an operative frequency varies from a low frequency range to a high frequency range, the LEV is employed mostly, rather than the capillary tube that has a limitation in a control range of a refrigerant flow rate.

A related art method for controlling operation of an inverter air conditioner will be described.

The related art method for controlling operation of an inverter air conditioner is provided with a starting operation step in which the air conditioner is operated while an operative frequency of a compressor is increased from, substantially, 0 Hz to a preset target frequency, and a regular operation step in which the inverter air conditioner is operated while keeping the target frequency after finish of the starting operation step, i.e., the compressor reaches to the target frequency.

In the starting operation step, the LEV expands refrigerant passed through the condenser in a state the LEV is opened to a preset portion.

When the compressor reaches to the target frequency, it is required that the inverter air conditioner enters into the regular operation step. However, when the compressor reaches to the target frequency, a degree of superheat of the refrigerant at an outlet of the compressor is not adequate for cooling the room. The degree of superheat of the refrigerant at an outlet of the compressor represents a value a pipeline temperature of the condenser is subtracted from a temperature of the refrigerant discharged from the compressor.

For elevating the degree of superheat of the refrigerant at an outlet of the compressor to an appropriate level, the LEV is opened smaller for a preset time period. However, in the process, the degree of superheat of the refrigerant at an outlet of the compressor can become excessive, i.e., overshoot.

Consequently, the related art method for controlling operation of the inverter air conditioner has the following problem.

If the degree of superheat of the refrigerant at an outlet of the compressor is excessive, the system becomes unstable, and for stabilizing the system again a certain time is required, and much power is consumed.

In order to cope with the problem, it is required to develop a method for controlling operation of an inverter air conditioner, which can prevent a system instability from taking place in a process the inverter air conditioner enters into the regular operation step through the starting operation step when the frequency of the compressor reaches to the target frequency.

SUMMARY OF THE INVENTION

Accordingly, the present invention is directed to a method for controlling the operation of an air conditioning system that substantially obviates one or more of the problems due to limitations and disadvantages of the related art.

An object of the present invention is to provide a method for controlling the operation of an air conditioning system, which can improve operation efficiency of the air conditioning system.

Additional features and advantages of the present invention will be set forth in the description which follows, and in part will be apparent to those having ordinary skill in the art upon examination of the following or may be learned from practice of the invention. The objectives and other advantages of the invention will be realized and attained by the structure particularly pointed out in the written description and claims hereof as well as the appended drawings.

To achieve these objects and other advantages and in accordance with the purpose of the present invention, as embodied and broadly described herein, the method for controlling operation of an air conditioning system includes a starting operation step for operating the air conditioning system until a frequency of a compressor reaches a preset target frequency, a system stabilizing step for stabilizing operation of the system after the frequency of the compressor reaches the preset target frequency, and a regular operation step for operating the system at a fixed level.

The system stabilizing step includes a first step for regulating opening of the expansion device, to increase the degree of superheat of refrigerant at an outlet of the compressor, comparing a temperature change rate of the condenser with respect to time to a preset temperature change rate, and a second step for, if the temperature change rate of the condenser with respect to time is lower than the preset temperature changer rate, comparing the degree of superheat of refrigerant at an outlet of the compressor to a preset degree of superheat of refrigerant at an outlet of the compressor, and opening the opening of the expansion device to a preset state, if the degree of superheat of refrigerant at an outlet of the compressor is higher than the preset degree of superheat of refrigerant at an outlet of the compressor.

The second step further includes the steps of measuring the temperature change rate with respect to time at the outlet of the compressor, if the degree of superheat of refrigerant at an outlet of the compressor is lower than the preset degree of superheat of refrigerant at an outlet of the compressor, upon comparison of the degree of superheat of refrigerant at an outlet of the compressor to the preset degree of superheat, and opening the opening of the expansion device to a preset state, determining that an adequate time period required for stabilizing the system is passed, if the temperature change rate with respect to time at the outlet of the compressor is lower than the preset temperature change rate.

The temperature of the condenser is measured at a part of a pipeline passed through the condenser, temperatures before and after which parts are constant.

The temperature of the condenser is measured at a part of a pipeline on an inlet side of the condenser.

The temperature of the condenser is measured at a part of a pipeline on an outlet side of the condenser.

The regular operation step includes the step of maintaining the opening of the expansion device to a preset state for operating the system as the fixed level.

The regulation of opening of the expansion device is made by regulating opening of an electronic linear expansion valve.

The system stabilizing step includes a first step for regulating the opening of the expansion device to increase the degree of superheat of refrigerant at an outlet of the compressor, and comparing the temperature change rate of the condenser with respect of time to a preset temperature change rate, and opening the opening of the expansion device to a first state, if the temperature change rate of the condenser with respect to time is lower than the preset temperature changer rate, and a second step for, after the first step, opening the opening of the expansion device to a second state if the degree of superheat of refrigerant at an outlet of the compressor is higher than the preset degree of superheat of refrigerant at an outlet of the compressor upon comparison of the degree of superheat of refrigerant at an outlet of the compressor to the preset degree of superheat of refrigerant at an outlet of the compressor.

It is to be understood that both the foregoing description and the following detailed description of the present invention are exemplary and explanatory and are intended to provide further explanation of the invention claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings;

FIGS. 4A and 4B illustrate graphs each showing a result of system operation according to a related art method for controlling operation of an air conditioning system, and a method for controlling operation of an air conditioning system in accordance with a preferred embodiment of the present invention.

DETAILED DESCRIPTION OF THE PREFERRED EMBODIMENT

Reference will now be made in detail to the preferred embodiments of the present invention, examples of which are illustrated in the accompanying drawings. In describing the embodiments, same parts will be given the same names and reference symbols, and repetitive description of which will be omitted.

Figure 1:
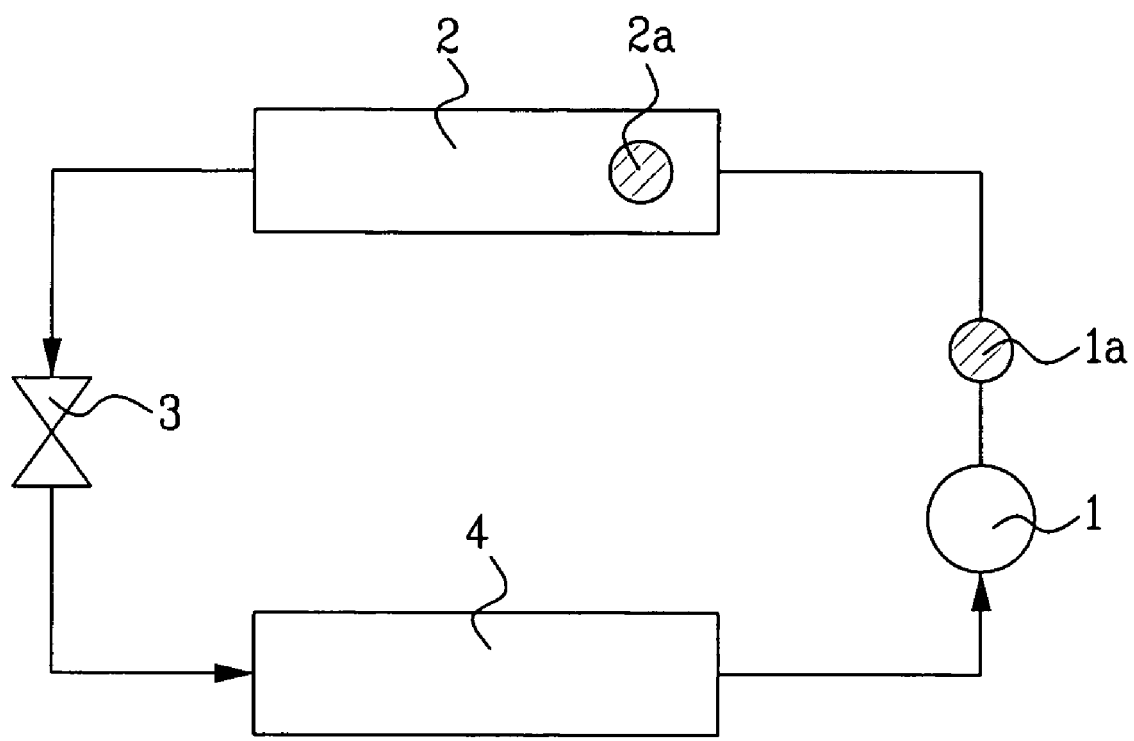
FIG. 1 illustrates a diagram of an air conditioning system controlled in accordance with a preferred embodiment of the present invention, schematically.

For better understanding of the present invention, a function of the air conditioning system will be described at first. The air conditioning system cools or heats rooms, such as residing space, office, and restaurant. In the cooling, the air conditioning system compresses low pressure refrigerant having heat absorbed from the room into high pressure refrigerant, and discharges the heat to outdoor air. Opposite to this, in the heating, the foregoing process is reversed. FIG. 1 illustrates a diagram of an air conditioning system controlled in accordance with a preferred embodiment of the present invention, schematically.

Referring to FIG. 1, the air conditioning system, being an inverter air conditioning system, includes a compressor 1 for drawing, and compressing refrigerant into a high temperature and high pressure refrigerant, and discharging the high temperature and high pressure refrigerant, a condenser 2 for condensing the high temperature and high pressure refrigerant for discharging heat to an outside of the air conditioning system an expansion device 3 for expanding the refrigerant from the condenser into a low pressure and low temperature refrigerant, and an evaporator 4 for absorbing heat from an outside of the air conditioning system and evaporating the refrigerant.

The air conditioning system includes a first temperature sensor 1a on a compressor 1 side, and a second temperature senor 2a on a condenser 2 side, additionally.

Though not shown in FIG. 1, the air conditioning system operated by the present invention further includes a microprocessor (not shown) for controlling an entire system with reference to temperatures measured at the first temperature sensor 1a and the second temperature senor 2a.

As described, the first temperature sensor 1a measures a temperature on the compressor side, and preferably, a temperature of a pipeline refrigerant from the compressor flows therein.

The second temperature sensor 2a is arranged to measure a temperature of the condenser. In more detail, in measuring the temperature of the condenser 2, a part of a pipeline passed through the condenser is measured, temperatures before and after which are constant. Or, in measuring the temperature of the condenser 2, a pipeline temperature at an inlet or outlet of the condenser may be measured.

In the meantime, it is preferable that the expansion device 3 is an LEV.

A method for controlling operation of an air conditioning system in accordance with a preferred embodiment of the present invention will be described, with reference to the foregoing description of the air conditioning system and the attached drawings.

Figure 2:
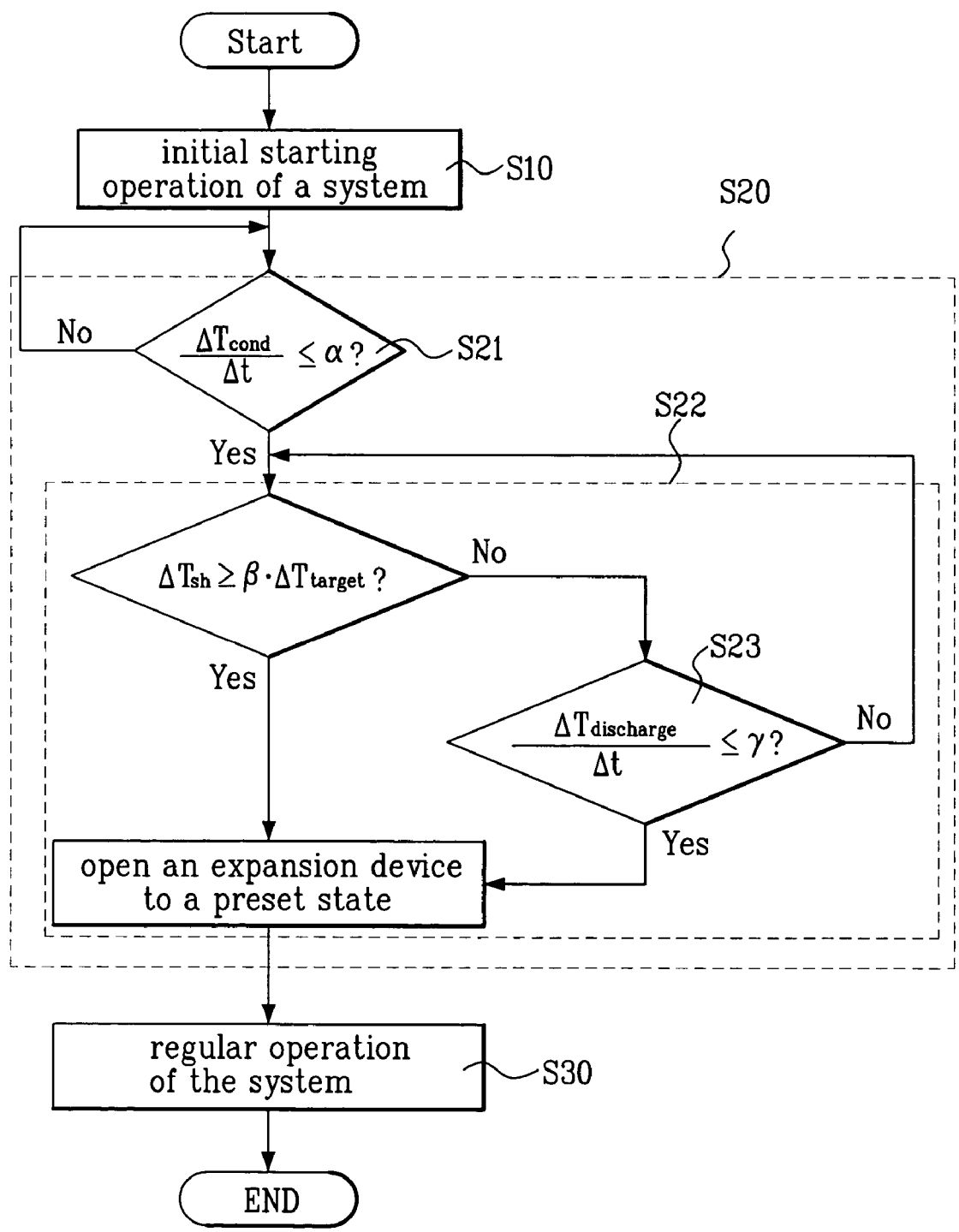
FIG. 2 illustrates a flow chart showing the steps of a method for controlling operation of an air conditioning system in accordance with a preferred embodiment of the present invention.

Referring to FIGS. 1 and 2, the method for controlling operation of an air conditioning system in accordance with a preferred embodiment of the present invention includes a step (S10) for carrying out starting operation of the air conditioning system, a step (S20) for carrying out stabilizing operation of the air conditioning system, and a step (S30) for carrying out a regular operation in which the air conditioning system is maintained at a preset level. The steps will be described in detail.

The starting operation step is an initial operation step in which, when power to the air conditioning system is turned on, the system is operated until an operative frequency of the compressor 1 reaches to a target frequency of the compressor fixed according to conditions of a room temperature, an outdoor temperature, and etc.

When the operative frequency of the compressor reaches to the target frequency, operation of the compressor is maintained at the level of the target frequency, when temperatures of the compressor and the condenser keep rising in a state the refrigerant does not reach to a degree of superheat that is adequate for cooling the room, yet.

When the starting operation step is finished, the system stabilizing step S20 including a first step and a second step is started.

In the first step S21, opening of the expansion device is regulated, to increase the degree of superheat of refrigerant at an outlet of the compressor, and a temperature change rate of the condenser with respect to time is compared to a preset temperature change rate.

Thus, in the present invention, for increasing the degree of superheat of refrigerant at an outlet of the compressor to a certain level, the opening of the expansion device 3 is regulated. In more detail, by decreasing opening of the expansion device, the degree of superheat of refrigerant at an outlet of the compressor is increased. This is because, if the opening of the expansion device is reduced to be smaller than the opening in the time of starting operation step, the degree of superheat of refrigerant at an outlet of the compressor is increased, which first step can be expressed as the following equation.

$$\frac{\Delta T_{cond}}{\Delta t} \leq \alpha,$$

where, $\Delta T_{cond}$ denotes the temperature change rate of the condenser, $\Delta t$ denotes a time period, and $\alpha$ is a constant denoting the preset temperature change rate of the condenser.

In the meantime, the first step in FIG. 2 includes the step of comparing the temperature change rate of the condenser to the preset temperature changer rate, though not shown, the first step may include the step of comparing a temperature of the condenser to a preset temperature.

In the second step S22, if the temperature change rate of the condenser 2 with respect to time is lower than the preset temperature changer rate, the degree of superheat of refrigerant at an outlet of the compressor is compared to a preset degree of superheat of refrigerant at an outlet of the compressor, so that the opening of the expansion device 3 is opened to a preset state, determining that an adequate time period required for stabilizing the system is passed if the degree of superheat of refrigerant at an outlet of the compressor is higher than the preset degree of superheat of refrigerant at an outlet of the compressor, which step can be expressed as the following equation.

$$\Delta T_{sh} \geq \beta \Delta T_{target},$$

where, $\Delta T_{sh}$ denotes the present degree of superheat of refrigerant at an outlet of the compressor, $T_{target}$ denotes the target degree of superheat of refrigerant at an outlet of the compressor, and $\beta$ is a constant denoting a ratio of the present degree of superheat of refrigerant at an outlet of the compressor to the target degree of superheat of refrigerant at an outlet of the compressor.

The second step described above is a case when $\beta=1$, which may vary with an operation condition.

In the meantime, the first step may be a primary system stabilizing step, because, if the temperature change rate of the condenser is lower than the preset temperature change rate, the system is stabilized.

It is preferable that the second step S22 further includes the step S23 of measuring the temperature change rate with respect to time at the outlet of the compressor, if the degree of superheat of refrigerant at an outlet of the compressor is lower than the preset degree of superheat of refrigerant at an outlet of the compressor, upon comparison of the degree of superheat of refrigerant at an outlet of the compressor to the preset degree of superheat, and opening the opening of the expansion device to a preset state, determining that an adequate time period required for stabilizing the system is passed, if the temperature change rate with respect to time at the outlet of the compressor is lower than the preset temperature change rate. The step S23 can be expressed as the following equation.

$$\frac{\Delta T_{discharge}}{\Delta t} \leq \gamma,$$

where, $\Delta T_{discharge}$ denotes the temperature change rate at the outlet of the compressor, $\Delta t$ denotes a time period, and $\gamma$ is a constant denoting the preset temperature change rate at the outlet of the compressor.

In measuring the temperature of the condenser 2, a part of a pipeline passed through the condenser is measured, temperatures before and after which are constant.

In the regular operation step S30, the opening of the expansion device is maintained at a preset state, and the system is operated at a fixed level.

In the meantime, another embodiment of the system stabilizing step will be described with reference to FIG. 3.

Figure 3:
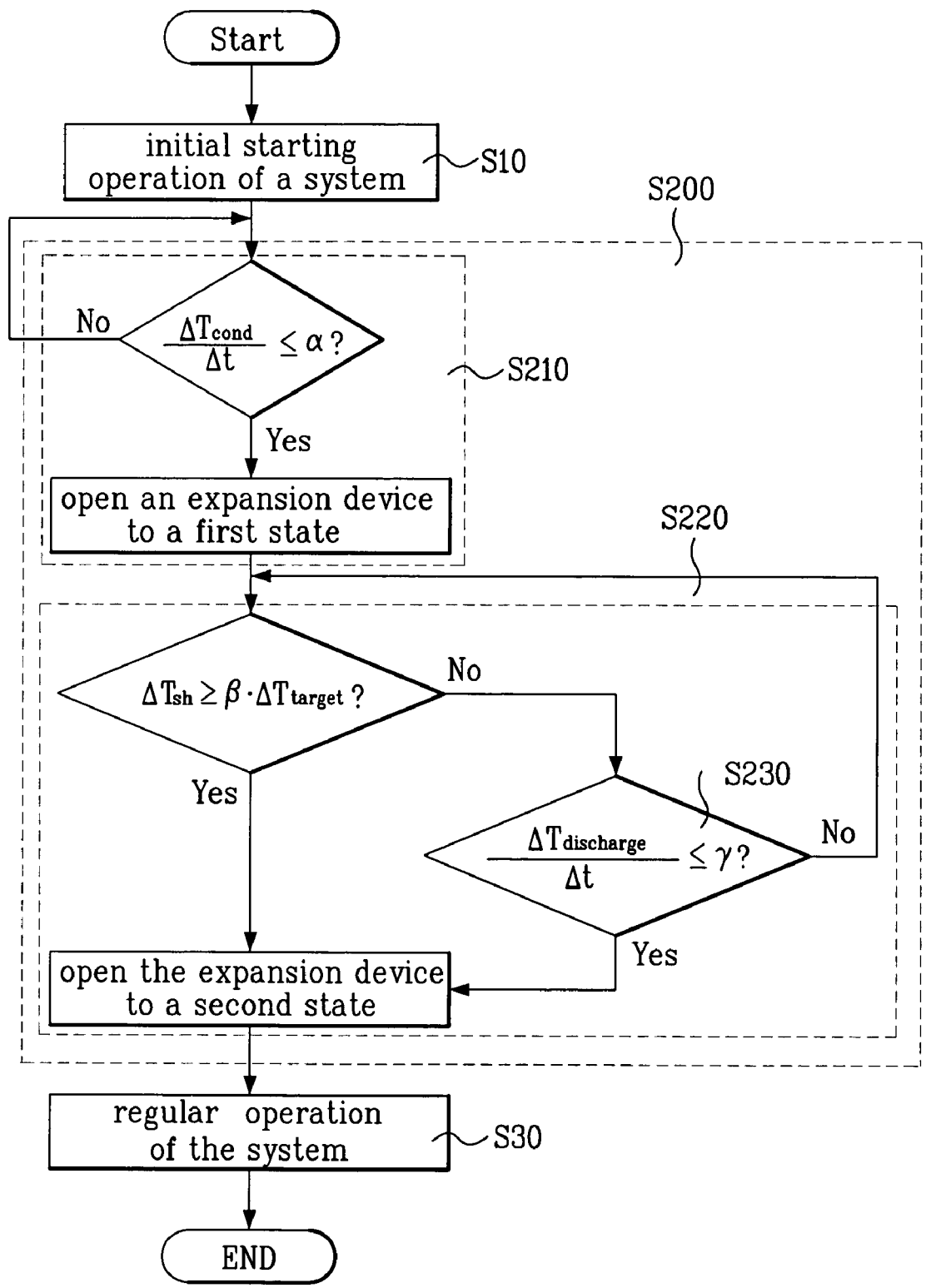
FIG. 3 illustrates a flow chart showing the steps of a method for controlling operation of an air conditioning system in accordance with another preferred embodiment of the present invention.

Referring to FIG. 3, the system stabilizing step S200 includes a first step S210 for regulating an opening of the expansion device 3, to increase the degree of superheat of the refrigerant at an outlet of the compressor, comparing a temperature change rate of the condenser 2 with respect to time to a preset temperature change rate, and opening the opening of the expansion device to a preset state, if the temperature change rate of the condenser 2 with respect to time is lower than the preset temperature change rate, and a second step S220 for, after the first step, comparing the degree of superheat of the refrigerant at an outlet of the compressor to a preset degree of superheat of the refrigerant at an outlet of the compressor, determining that an adequate time required for stabilizing the system is passed if the degree of superheat of the refrigerant at an outlet of the compressor is higher than the preset degree of superheat of the refrigerant at an outlet of the compressor, and opening the opening of the expansion device 3 to a preset state.

It is preferable that the second step S220 further includes the step S230 of measuring the temperature change rate with respect to time at the outlet of the compressor, if the degree of superheat of refrigerant at an outlet of the compressor is lower than the preset degree of superheat of refrigerant at an outlet of the compressor, upon comparison of the degree of superheat of refrigerant at an outlet of the compressor to the preset degree of superheat, and opening the opening of the expansion device to a preset state, determining that an adequate time period required for stabilizing the system is passed, if the temperature change rate with respect to time at the outlet of the compressor is lower than the preset temperature change rate, which step S230 is shown in FIG. 2.

FIGS. 4A and 4B illustrate graphs each showing a result of system operation according to a related art method for controlling operation of an air conditioning system, and a method for controlling operation of an air conditioning system in accordance with a preferred embodiment of the present invention, wherein, as shown in FIG. 4A, it can be noted that the system is unstable in the related art, to cause overshoot of a discharge temperature of the compressor 1 at the time of finish of an initial starting operation, and take a long time for stabilizing the system.

However, as shown in FIG. 4B, it can be noted that the present invention prevents the discharge temperature from overshooting to improve stability of the system, thereby reducing the time period required for stabilizing the system.

As has been described, the method for controlling operation of an air conditioning system of the present invention has the following advantages.

First, a time period required for entering into the regular operation after the initial starting operation is reduced.

Second, the excessive overshoot of the air conditioning system before the regular operation is prevented, to improve operation efficiency.

Third, the reduction in the time period entering into the regular operation, and the prevention of the overshooting reduce power consumption.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for controlling the operation of an air conditioning system, comprising the steps of:
    operating the air conditioning system until a frequency of a compressor reaches to a preset target frequency;
    stabilizing the operation of the system after the frequency of the compressor reaches the preset target frequency; and
    operating the system at a fixed level, wherein the stabilizing step is performed on the basis of data including a temperature change rate of the condenser and the degree of superheat of the refrigerant at an outlet of the compressor in order to regulate the opening of an expansion valve.

2. The method as claimed in claim 1, wherein the stabilizing step includes;
    a first step for regulating the opening of the expansion device, to increase the degree of superheat of refrigerant at an outlet of the compressor, and comparing a temperature change rate of the condenser with respect to time to a preset temperature change rate, and
    a second step for, if the temperature change rate of the condenser with respect to time is lower than the preset temperature changer rate, comparing the degree of superheat of refrigerant at an outlet of the compressor to a preset degree of superheat of refrigerant at an outlet of the compressor, and opening the opening of the expansion device to a preset state, if the degree of superheat of refrigerant at an outlet of the compressor is higher than the preset degree of superheat of refrigerant at an outlet of the compressor.

3. The method as claimed in claim 2, wherein the second step further includes the steps of;
    measuring the temperature change rate with respect to time at the outlet of the compressor, if the degree of superheat of refrigerant at an outlet of the compressor is lower than the preset degree of superheat of refrigerant at an outlet of the compressor, upon comparison of the degree of superheat of refrigerant at an outlet of the compressor to the preset degree of superheat, and
    opening the opening of the expansion device to a preset state, determining that an adequate time period required for stabilizing the system is passed, if the temperature change rate with respect to time at the outlet of the compressor is lower than the preset temperature change rate.

4. The method as claimed in claim 3, wherein the temperature of the compressor is measured at a part of a pipeline refrigerant discharged from the compressor flows therethrough.

5. The method as claimed in claim 2, wherein the temperature of the condenser is measured at a part of a pipeline passed through the condenser, temperatures before and after which part are constant.

6. The method as claimed in claim 2, wherein the temperature of the condenser is measured at a part of a pipeline on an inlet side of the condenser.

7. The method as claimed in claim 2, wherein the temperature of the condenser is measured at a part of a pipeline on an outlet side of the condenser.

8. The method as claimed in claim 2, wherein the regulation of opening of the expansion device is made by regulating opening of an electronic linear expansion valve.

9. The method as claimed in claim 1, wherein the system stabilizing step includes;
    a first step for regulating the opening of the expansion device to increase the degree of superheat of refrigerant at an outlet of the compressor, and comparing the temperature change rate of the condenser with respect of time to a preset temperature change rate, and opening the opening of the expansion device to a first state, if the temperature change rate of the condenser with respect to time is lower than the preset temperature changer rate, and
    a second step for, after the first step, opening the opening of the expansion device to a second state if the degree of superheat of refrigerant at an outlet of the compressor is higher than the preset degree of superheat of refrigerant at an outlet of the compressor upon comparison of the degree of superheat of refrigerant at an outlet of the compressor to the preset degree of superheat of refrigerant at an outlet of the compressor.

10. The method as claimed in claim 9, wherein the second step further includes the steps of;
    measuring the temperature change rate with respect to time at the outlet of the compressor, if the degree of superheat of refrigerant at an outlet of the compressor is lower than the preset degree of superheat of refrigerant at an outlet of the compressor, upon comparison of the degree of superheat of refrigerant at an outlet of the compressor to the preset degree of superheat, and
    opening the opening of the expansion device to a preset state, determining that an adequate time period required for stabilizing the system is passed, if the temperature change rate with respect to time at the outlet of the compressor is lower than the preset temperature change rate.

11. The method as claimed in claim 9, wherein the temperature of the condenser is measured at a part of a pipeline passed through the condenser, temperatures before and after which part are constant.

12. The method as claimed in claim 9, wherein the temperature of the condenser is measured at a part of a pipeline on an inlet side of the condenser.

13. The method as claimed in claim 9, wherein the temperature of the condenser is measured at a part of a pipeline on an outlet side of the condenser.

14. The method as claimed in claim 1, wherein the regular operation step includes the step of maintaining the opening of the expansion device to a preset state for operating the system as the fixed level.

15. A method for controlling the operation of an air conditioning system, comprising the steps of:
    operating the air conditioning system until a frequency of a compressor reaches to a present target frequency;
    stabilizing the operation of the system after the frequency of the compressor reaches to the preset target frequency; and
    operating the system at a fixed level, wherein the stabilizing step includes;
    a first step for regulating the opening of the expansion device, to increase the degree of superheat of refrigerant at an outlet of the compressor, and comparing a temperature of the condenser to a preset temperature, and
    a second step for, if the temperature of the condenser is higher than the preset temperature changer rate, comparing the degree of superheat of refrigerant at an outlet of the compressor to a preset degree of superheat of refrigerant at an outlet of the compressor, and opening the opening of the expansion device to a preset state, if the degree of superheat of refrigerant at an outlet of the compressor is higher than the preset degree of superheat of refrigerant at an outlet of the compressor.

16. The method as claimed in claim 15, wherein the second step further includes the steps of;
    measuring the temperature change rate with respect to time at the outlet of the compressor, if the degree of superheat of refrigerant at an outlet of the compressor is lower than the preset degree of superheat of refrigerant at an outlet of the compressor, upon comparison of the degree of superheat of refrigerant at an outlet of the compressor to the preset degree of superheat, and
    opening the opening of the expansion device to a preset state, determining that an adequate time period required for stabilizing the system is passed, if the temperature change rate with respect to time at the outlet of the compressor is lower than the preset temperature change rate.

17. The method as claimed in claim 15, wherein the temperature of the condenser is measured at a part of a pipeline passed through the condenser, temperatures before and after which part are constant.

18. The method as claimed in claim 15, wherein the temperature of the condenser is measured at a part of a pipeline on an inlet side of the condenser.

19. The method as claimed in claim 15, wherein the temperature of the condenser is measured at a part of a pipeline on an outlet side of the condenser.

* * * * *